US008971076B2

(12) United States Patent
Nate et al.

(10) Patent No.: US 8,971,076 B2
(45) Date of Patent: Mar. 3, 2015

(54) POWER FACTOR CORRECTION CIRCUIT

(75) Inventors: Satoru Nate, Kyoto (JP); Yoshinori Sato, Kyoto (JP)

(73) Assignee: Rohm Co., Ltd. (JP)

( * ) Notice: Subject to any disclaimer, the term of this patent is extended or adjusted under 35 U.S.C. 154(b) by 470 days.

(21) Appl. No.: 13/366,623

(22) Filed: Feb. 6, 2012

(65) Prior Publication Data

US 2012/0201065 A1 Aug. 9, 2012

(30) Foreign Application Priority Data

Feb. 8, 2011 (JP) ................................ 2011-025018
May 16, 2011 (JP) ................................ 2011-109812

(51) Int. Cl.
*H02M 1/42* (2007.01)

(52) U.S. Cl.
CPC ............ *H02M 1/4225* (2013.01); *Y02B 70/126* (2013.01)
USPC ............................................ 363/89; 323/207

(58) Field of Classification Search
USPC .................................... 323/207, 222; 363/89
See application file for complete search history.

(56) References Cited

U.S. PATENT DOCUMENTS 7,397,678 B2 * 7/2008 Frank et al. .................... 363/89
7,795,847 B2 * 9/2010 Kort ............................ 323/222
8,212,539 B2 * 7/2012 Osaka .......................... 323/272
2007/0067069 A1 * 3/2007 Markowski .................. 700/297
2008/0272747 A1 * 11/2008 Melanson .................... 323/205
2009/0290395 A1 * 11/2009 Osaka .......................... 363/126
2010/0109626 A1 * 5/2010 Chen ............................ 323/282
2011/0122664 A1 * 5/2011 Yabuzaki et al. ............... 363/53
2012/0249110 A1 * 10/2012 Mohr et al. .................. 323/299

FOREIGN PATENT DOCUMENTS

JP 2010-114993 A 5/2010

* cited by examiner

*Primary Examiner* — Fred E Finch, III
(74) *Attorney, Agent, or Firm* — Cantor Colburn LLP

(57) ABSTRACT

A first error amplification circuit amplifies a difference between a predetermined reference voltage and a first detection voltage that corresponds to the output voltage of a DC/DC converter, so as to generate a second voltage. A voltage level judgment circuit generates a third voltage having a discrete level that corresponds to the amplitude of a first voltage. A multiplying/dividing circuit multiplies the first voltage by the second voltage, and divides the resulting product by the third voltage, so as to generate a fourth voltage. A comparator compares the fourth voltage with a second detection voltage that corresponds to a current that flows through a switching transistor included in the DC/DC comparator. A driving circuit turns on the switching transistor for each predetermined period, and turns off the switching transistor according to the output of the comparator every time the second detection voltage becomes higher than the fourth voltage.

16 Claims, 11 Drawing Sheets

200

15

POWER FACTOR CORRECTION CIRCUIT

BACKGROUND OF THE INVENTION

1. Field of the Invention

The present invention relates to a power factor correction circuit employing a DC/DC converter.

2. Description of the Related Art

Various kinds of consumer electronics devices such as TVs, refrigerators, etc., or otherwise electronic devices such as laptop computers, cellular phone terminals, and PDAs (Personal Digital Assistants), are each configured to operate receiving electric power from an external circuit, and to be capable of charging a built-in battery using electric power received from an external power supply. Such consumer electronics devices and electronic devices (which will collectively be referred to as "electronic devices" hereafter) each include a built-in power supply apparatus configured to perform AC/DC conversion of commercial AC voltage. Alternatively, such a power supply apparatus is configured as a built-in component included within an external power supply adapter (AC adapter) for such an electronic device.

The power supply apparatus includes a rectifier circuit (diode bridge circuit) configured to rectify an AC voltage, and an insulating DC/DC converter configured to step down the rectified voltage, and to supply the voltage thus stepped down to a load. AC/DC conversion by means of such a power supply apparatus involves the development of current pulses having a very high amplitude. Such current pulses lead to problems of increased radiation noise, increased network loss, and increased high-frequency components over the entire high-frequency region. In order to solve such problems, in a case in which a given electronic device requires not less than a certain amount of power consumption, there is a need to mount a PFC (power factor correction) circuit on such an electronic device. The PFC circuit is configured to monitor an AC input voltage and an input current, and to perform phase adjustment such that the phase of the AC input voltage and the phase of the input current match each other.

RELATED ART DOCUMENTS

Patent Documents

[Patent Document 1]

Japanese Patent Application Laid Open No. 2010-114993

Various ranges of commercial AC voltages are employed in various countries or regions. Such a voltage range is on the order of 85 V through 265 V, taking into account the margin of error and fluctuation. In a case in which the PFC circuit is not provided with any countermeasure function, such an arrangement has a problem in that the maximum power consumption of the PFC circuit increases in proportion to the square of the input voltage.

SUMMARY OF THE INVENTION

The present invention has been made in view of such a situation. Accordingly, it is an exemplary purpose of an embodiment of the present invention to provide a PFC circuit configured to be capable of suppressing an increase in the maximum power consumption due to an increase in the input electric power, and a control circuit thereof.

An embodiment of the present invention relates to a control circuit for a power factor correction circuit that comprises a DC/DC converter. The control circuit comprises: an input voltage detection terminal configured to receive a first voltage having a full-wave rectified waveform; a first error amplification circuit configured to amplify a difference between a predetermined reference voltage and a first detection voltage that corresponds to an output voltage of the DC/DC converter so as to generate a second voltage; a voltage level judgment circuit configured to generate a third voltage having a discrete level that corresponds to an amplitude level of the first voltage; a multiplying/dividing circuit configured to multiply the first voltage by the second voltage, and to divide the resulting product by the third voltage, so as to generate a fourth voltage; a comparator configured to make a comparison between the fourth voltage and a second detection voltage that corresponds to a current that flows through a switching transistor included in the DC/DC converter; and a driving circuit configured to turn on the switching transistor for each predetermined period, and to turn off the switching transistor according to an output signal of the comparator every time the second detection voltage becomes higher than the fourth voltage.

Another embodiment of the present invention also relates to a control circuit. The control circuit comprises: an input voltage detection terminal configured to receive a first voltage having a full-wave rectified waveform; a first error amplification circuit configured to amplify a difference between a predetermined reference voltage and a first detection voltage that corresponds to an output voltage of the DC/DC converter so as to generate a second voltage; a voltage level judgment circuit configured to generate a third voltage having a discrete level that corresponds to an amplitude level of the first voltage; a multiplying/dividing circuit configured to multiply the first voltage by the second voltage, and to divide the resulting product by the third voltage, so as to generate a fourth voltage; a second error amplification circuit configured to amplify a difference between the fourth voltage and a second detection voltage that corresponds to a current that flows through a switching transistor included in the DC/DC converter; and a driving circuit configured to drive the switching transistor according to the error signal.

With such embodiments, when the amplitude of the AC voltage becomes large, the third voltage is increased in a stepwise manner according to an increase in the amplitude of the AC voltage. Thus, such an arrangement is capable of suppressing an increase in the amplitude of the fourth voltage due to an increase in the AC voltage. A feedback operation is performed such that the waveform that corresponds to a current that flows through the switching transistor matches the waveform of the fourth voltage. Thus, such an arrangement is capable of suppressing an increase in the maximum power consumption due to an increase in the amplitude of the AC voltage.

Also, the multiplying/dividing circuit may comprise: a first voltage/current conversion circuit configured to apply the first voltage to a first resistor so as to generate a first current; a second voltage/current conversion circuit configured to apply the second voltage to a second resistor so as to generate a second current; a third voltage/current conversion circuit configured to apply a predetermined voltage to a third resistor so as to generate a third current; and a multiplier configured to generate a fourth current by multiplying the first current by the second current, and by dividing the resulting product by the third current, and to apply the resulting fourth current to a fourth resistor, so as to generate a fourth voltage.

With the resistance values of the first resistor through the fourth resistor as R1 through R4, the fourth voltage is proportional to $R3 \times R4/(R1 \times R2)$. Thus, even if the resistance values of the first resistor through the fourth resistor fluctuate at the same rate due to temperature fluctuation, process variation, or the like, such an arrangement is capable of reducing the effects of such fluctuation on the fourth voltage, thereby improving the temperature characteristics of the PFC circuit.

Also, the multiplier may comprise: a differential amplifier comprising a differential pair formed of a first bipolar transistor and a second bipolar transistor, a fourth bipolar transistor and a fifth bipolar transistor arranged such that the respective emitters thereof are connected to the corresponding collectors of the first and second bipolar transistors, and a current source configured to supply a tail current to the differential pair; a third bipolar transistor arranged on a path of a current that corresponds to the third current, such that its emitter is connected to the base of the first bipolar transistor, and its base is connected to the collector of the second bipolar transistor; a sixth bipolar transistor arranged on a path of a current that corresponds to the second current, such that its emitter is connected to the base of the second bipolar transistor; and a seventh bipolar transistor arranged on a path of a current that corresponds to the first current, such that its emitter is connected to the base of the sixth bipolar transistor, and its base is biased to the same bias level as that of the fourth and fifth bipolar transistors. Also, the multiplier may be configured to generate the fourth current according to a current that flows through the first and fourth bipolar transistors. Also, the fourth resistor may be arranged on a path of the fourth current.

With such a configuration, by multiplying the first current by the second current, and dividing the resulting product by the third current, the fourth current is thereby generated.

Also, the voltage level judgment circuit may comprise: multiple comparators each configured to generate a comparison signal which is asserted when the first voltage is higher than its predetermined threshold voltage; multiple latch circuits each configured to latch its state when the corresponding comparison signal is asserted, and to be reset for each predetermined period; and a voltage generating unit configured to generate the third voltage having a level that corresponds to the states of the multiple latch circuits.

Also, the voltage level judgment circuit may be configured to set the third voltage to its highest level during a period starting from the start-up operation.

Also, the first error amplification circuit may include a first current source configured such that it is switched to the on state, in which the second voltage is raised, when the first detection voltage is lower than a first threshold voltage.

Such an arrangement is capable of suppressing a rise in the output voltage of the DC/DC converter.

Also the first error amplification circuit may include a second current source configured such that it is switched to the on state, in which the second voltage is reduced, when the first detection voltage is higher than a second threshold voltage.

Such an arrangement is capable of reducing the effects of a sharp change in the load of the DC/DC converter.

Yet another embodiment of the present invention relates to a power factor correction circuit. The power factor correction circuit comprises: an output circuit for a DC/DC converter comprising a switching transistor; and a control circuit according to any one of the aforementioned embodiments, configured to drive the switching transistor.

Yet another embodiment of the present invention relates to an electronic device. The electronic device comprises: a rectifier circuit configured to perform full-wave rectification of a commercial AC voltage; the aforementioned power factor correction circuit configured to receive an output voltage of the rectifier circuit; and a DC/DC converter configured to receive an output voltage of the power factor correction circuit, to step down the output voltage, and to output the output voltage thus stepped down to a load.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

In the present specification, the state represented by the phrase "the member A is connected to the member B" includes a state in which the member A is indirectly connected to the member B via another member that does not substantially affect the electric connection therebetween, or that does not damage the functions or effects of the connection therebetween, in addition to a state in which the member A is physically and directly connected to the member B.

Similarly, the state represented by the phrase "the member C is provided between the member A and the member B" includes a state in which the member A is indirectly connected to the member C, or the member B is indirectly connected to the member C via another member that does not substantially affect the electric connection therebetween, or that does not damage the functions or effects of the connection therebetween, in addition to a state in which the member A is directly connected to the member C, or the member B is directly connected to the member C.

First Embodiment

Figure 1:
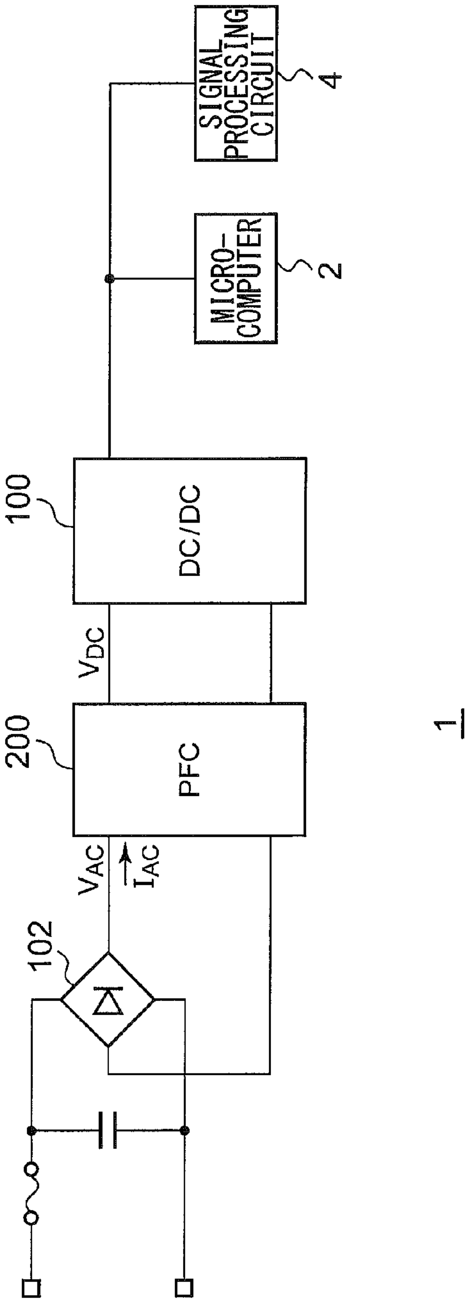
FIG. 1 is a circuit diagram which shows a configuration of an electronic device according to a first embodiment.

FIG. 1 is a circuit diagram which shows a configuration of an electronic device 1 according to an embodiment.

The electronic device 1 is configured as a consumer electronics device such as a TV, refrigerator, air conditioner, or the like, or otherwise as a computer. The electronic device 1 includes a microcomputer 2, a signal processing circuit 4, a DC/DC converter 100, a rectifier circuit 102, and a PFC (power factor correction circuit) 200. The electronic device 1 is partitioned into a primary side and a secondary side that are electrically insulated from each other by means of an insulating transformer (not shown) of the DC/DC converter 100.

The rectifier circuit 102 is configured as a diode rectifier circuit, for example, and is configured to receive an AC voltage such as commercial AC voltage or the like, and to perform full-wave rectification of the AC voltage thus received so as to generate an AC voltage $V_{AC}$.

The PFC circuit 200 is configured as a step-up DC/DC converter (switching regulator), and is configured to receive the AC voltage $V_{AC}$ from the rectifier circuit 102, and to generate an output voltage $V_{DC}$. The PFC circuit 200 is configured to improve the power factor by performing phase adjustment such that the phase of the AC voltage $V_{AC}$ and the phase of the input current $I_{AC}$ match each other.

The DC/DC converter 100 is configured to receive the output voltage $V_{DC}$ of the PFC circuit 200, to step down the output voltage $V_{DC}$, and to output the output voltage thus stepped down to the microcomputer 2 and the signal processing circuit 4, which each function as a load.

The microcomputer 2 is configured to integrally control the overall operation of the electronic device 1. The signal processing circuit 4 is a block configured to perform predetermined signal processing, examples of which include an interface circuit configured to communicate with an external device, an image processing circuit, an audio processing circuit, and so forth. It is needless to say that, in practice, the electronic device 1 includes multiple signal processing circuits 4 according to the functions thereof.

The above is the overall configuration of the electronic device 1. Next, description will be made regarding the PFC circuit 200 which can be suitably employed in such an electronic device 1.

Figure 2:
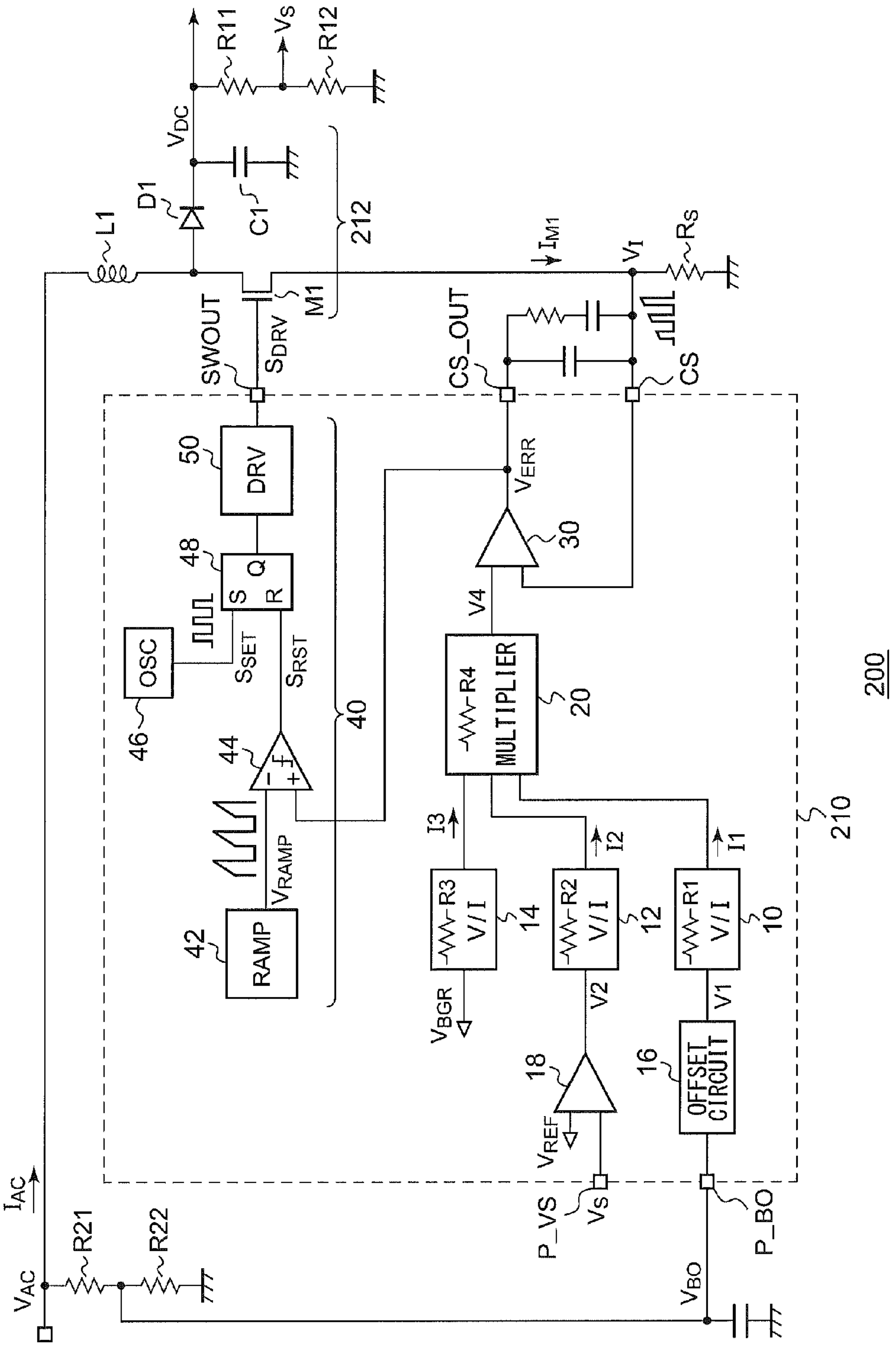
FIG. 2 is a circuit diagram which shows a configuration of a PFC circuit according to the first embodiment.

FIG. 2 is a circuit diagram which shows a configuration of the PFC circuit 200 according to the first embodiment.

The PFC circuit 200 includes a step-up DC/DC converter, and mainly includes a control circuit 210 and an output circuit 212. The output circuit 212 has a typical topology including an inductor L1, a diode D1, a capacitor C1, and a switching transistor M1, and accordingly, detailed description thereof will be omitted. The input voltage $V_{AC}$ is stepped down by means of switching performed by the switching transistor M1, thereby generating the output voltage $V_{DC}$. It should be noted that it can be said that the PFC circuit 200 has the same configuration as that of a DC/DC converter. However, the PFC circuit 200 is configured to receive the input voltage $V_{AC}$ as a full-wave rectified AC voltage, and to output the output voltage $V_{DC}$ as a DC voltage. Thus, it can be said that the operation of the PFC circuit 200 is the same operation as that of an AC/DC converter.

A pair of resistors R11 and R12 is configured to divide the output voltage $V_{DC}$ of the PFC circuit 200, so as to generate a first detection voltage $V_S$ that corresponds to the output voltage $V_{DC}$. The first detection voltage $V_S$ is input to an output voltage detection terminal (P_VS terminal) of the control circuit 210.

A detection resistor $R_S$ is arranged on a path of the switching transistor M1. A second detection voltage $V_I$ occurs between both terminals of the detection resistor $R_S$, which is proportional to the current $I_{M1}$ that flows through the switching transistor M1. The second detection voltage $V_I$ is input to a current detection terminal (CS terminal) of the control circuit 210 as a feedback signal. The second detection voltage $V_I$ has an intermittent waveform that corresponds to the switching operation of the switching transistor M1. It can be assumed that the envelope curve of the second detection voltage $V_I$ matches the input current $I_{AC}$ of the PFC circuit 200.

Furthermore, the full-wave rectified AC voltage $V_{AC}$ is divided by a pair of resistors R21 and R22. The AC voltage $V_{BO}$ thus divided is input to an input voltage detection terminal (P_BO terminal) of the control circuit 210.

Description will be made below regarding a specific configuration of the control circuit 210. The control circuit 210 includes a first V/I conversion circuit 10, a second V/I conversion circuit 12, a third V/I conversion circuit 14, an offset circuit 16, a first error amplification circuit 18, a multiplier 20, a second error amplification circuit 30, and a driving circuit 40.

The first V/I conversion circuit 10 includes a first resistor R1, and is configured to apply a first voltage V1 that corresponds to the full-wave rectified AC voltage $V_{AC}$ input to the DC/DC converter (PFC circuit 200) to the first resistor R1, so as to generate a first current I1. The first voltage V1 has a full-wave rectified waveform.

$$I1=K1\times V1/R1 \tag{1}$$

Here, K1 represents a proportional constant.

The offset circuit 16 is arranged at a previous stage of the first V/I conversion circuit 10, and is configured to apply, to the AC voltage $V_{AC}$ obtained by full-wave rectification and voltage-division, an offset toward the high electric potential side. The output signal of the offset circuit 16 is input to the first V/I conversion circuit 10 as the first voltage V1.

The first error amplification circuit 18 is configured to amplify the difference between the first detection voltage $V_S$ that corresponds to the output voltage $V_{DC}$ of the DC/DC converter and a predetermined reference voltage $V_{REF}$ so as to generate a second voltage V2.

The second V/I conversion circuit 12 includes a second resistor R2, and is configured to apply the second voltage V2 to the second resistor R2, thereby converting the second voltage V2 into a second current I2.

$$I2=K2\times V2/R2 \tag{2}$$

Here, K2 represents a proportional constant.

The third V/I conversion circuit 14 includes a third resistor R3, and is configured to apply a predetermined voltage $V_{BGR}$ (=V3) to the third resistor R3 so as to generate a third current I3. The predetermined voltage $V_{BGR}$ is preferably configured as a constant voltage which is independent of the temperature, and is preferably generated by an unshown band gap reference circuit.

$$I3=K3\times V_{BGR}/R3 \tag{3}$$

Here, K3 represents a proportional constant.

The multiplier 20 is configured to generate a fourth current I4 by multiplying the first current I1 by the second current I2, and by dividing the resulting product by the third current I3. The multiplier 20 includes a fourth resistor R4, and is configured to generate a fourth voltage V4 by means of the fourth current I4 flowing through the fourth resistor R4.

$$V4=I4\times R4 \tag{4}$$

The second error amplification circuit 30 is configured to amplify the difference between the second detection voltage $V_I$ that corresponds to the current $I_{M1}$ that flows through the switching transistor M1 of the output circuit 212 and the fourth voltage V4 output from the multiplier 20, so as to generate an error voltage $V_{ERR}$.

The driving circuit 40 is configured to drive the switching transistor M1 according to the error voltage $V_{ERR}$. The driving circuit 40 is configured to generate a driving signal $S_{DRV}$ having a duty ratio that corresponds to the error voltage $V_{ERR}$, by means of a pulse modulation method such as pulse width modulation (PWM), pulse frequency modulation (PFM), or the like, for example, and to output the driving signal $S_{DRV}$ thus generated to the gate of the switching transistor M1 via an output terminal SWOUT. The configuration of the driving circuit 40 is not restricted in particular, and is preferably configured using known techniques.

FIG. 2 shows an example of the driving circuit 40 configured to operate in a PWM manner. The driving circuit 40 includes a ramp wave generating unit 42, a comparator 44, an oscillator 46, an RS flip-flop 48, and a driver 50.

The ramp wave generating unit 42 is configured to generate a cyclic voltage $V_{RAMP}$ having a sawtooth waveform or otherwise a triangle waveform having a predetermined frequency (for example, 65 kHz). The comparator 44 is configured to compare the error voltage $V_{ERR}$ with the cyclic voltage $V_{RAMP}$, and to generate a reset signal $S_{RST}$ having a level that transits every time the error voltage $V_{ERR}$ crosses the cyclic voltage $V_{RAMP}$. The reset signal $S_{RST}$ provides a positive edge every time $V_{ERR}$ crosses $V_{RAMP}$ upward from the lower side.

The oscillator 46 is configured to generate a set signal $S_{SET}$ having a predetermined frequency. The RS flip-flop 48 is arranged such that the set signal $S_{SET}$ is received via its set terminal (S) and the reset signal $S_{RST}$ is received via its reset terminal (R). The output (Q) of the RS flip-flop 48 transits to high level for each positive edge of the set signal $S_{SET}$, and transits to low level for each positive edge of the reset signal $S_{RST}$.

The generation of the set signal $S_{SET}$ is not restricted to such an operation of the oscillator 46. For example, instead of such an oscillator 46, such an arrangement may include a zero-crossing comparator configured to generate a set signal $S_{SET}$ having a level that transits (a positive edge) when the current that flows through the inductor L1 drops to substantially zero. For example, by providing an auxiliary winding to the inductor L1, such an arrangement is capable of suitably detecting the current that flows through the inductor L1. In this case, such an arrangement is capable of using energy stored in the inductor L1 with high efficiency as compared with an arrangement employing the oscillator 46. The set signal $S_{SET}$ may be generated using other methods. The same can be said of a modification which will be described later with reference to FIG. 5.

The output of the RS flip-flop 48 is configured as a pulse-width modulated signal $S_{PWM}$. The driver 50 is configured to perform switching of the switching transistor M1 according to the PWM signal $S_{PWM}$.

The duty ratio of the PWM signal $S_{PWM}$ is adjusted by means of the feedback loop including the first error amplification circuit 18 and the feedback loop including the second error amplification circuit 30 such that the first detection voltage $V_S$ matches the reference voltage $V_{REF}$ and the envelope waveform of the current $I_{M1}$ that flows through the switching transistor M1 matches the waveform of the full-wave rectified input voltage $V_{AC}$.

The above is the overall configuration of the PFC circuit 200. Next, description will be made regarding a specific example configuration of the control circuit 210.

Figure 3:
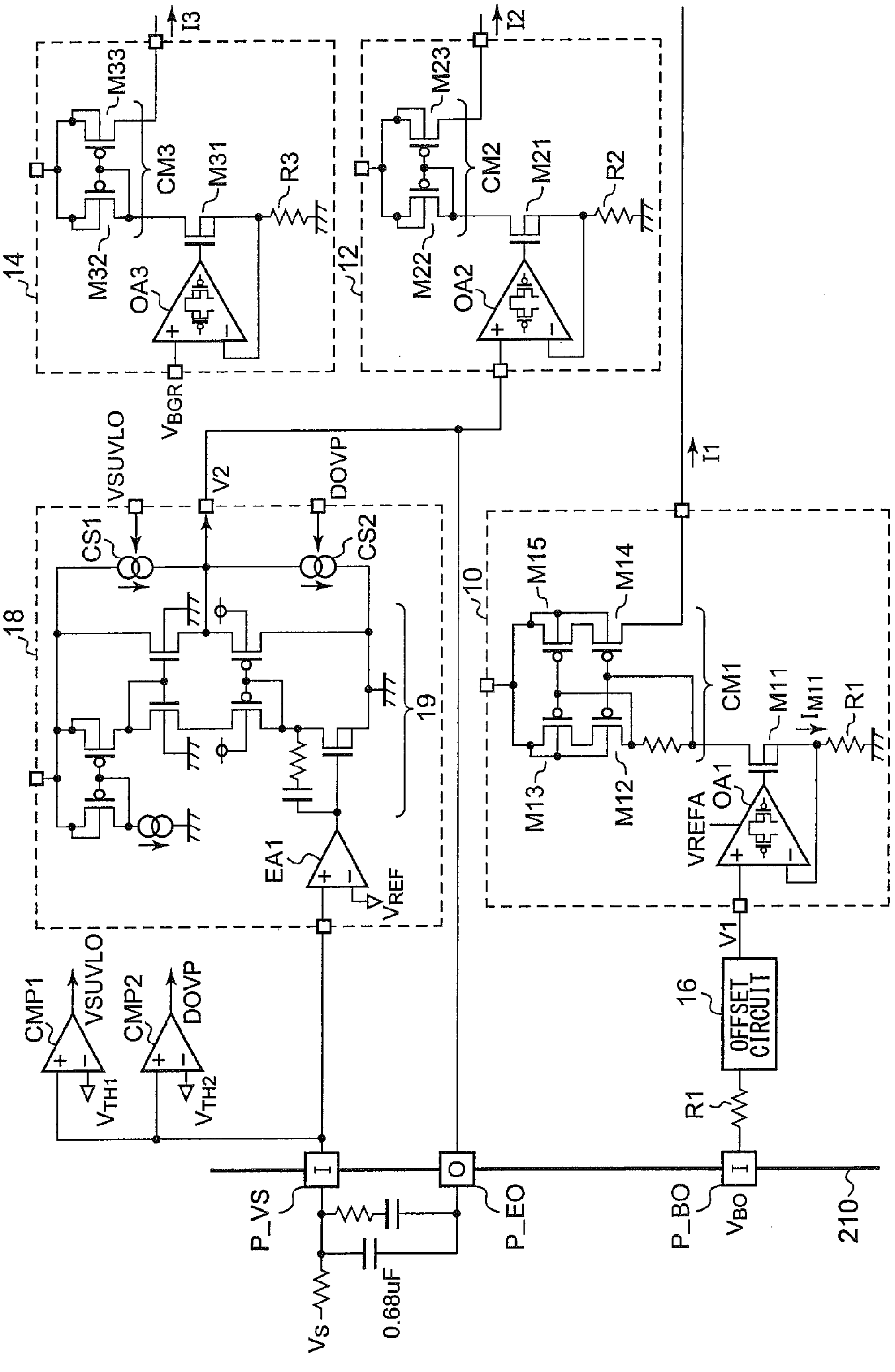
FIG. 3 is a circuit diagram which shows a part of the configuration of a control circuit.

FIG. 3 is a circuit diagram which shows a part of the configuration of the control circuit 210.

The offset circuit 16 is configured to receive the input voltage $V_{BO}$ obtained by dividing the full-wave rectified AC voltage $V_{AC}$, and to apply an offset to the input voltage $V_{BO}$ thus received so as to generate the first voltage V1.

The first V/I conversion circuit 10 includes a transistor M11, an operational amplifier OA1, and a current mirror circuit CM1, in addition to the first resistor R1. The first resistor R1 is arranged such that one terminal thereof is grounded. The transistor M11 is arranged such that one terminal (source) thereof is connected to the first resistor R1 and the inverting input terminal of the operational amplifier OA1. The first voltage V1 is input to the non-inverting input terminal of the operational amplifier OA1. A current $I_{M11}$ flows through the transistor M11 and the resistor R1.

$$I_{M11}=V1/R1$$

A current mirror circuit CM1 is configured as a cascode current mirror circuit including transistors M12 through M15 and a resistor R2, and to mirror the current $I_{M11}$, thereby outputting the first current I1. In a case in which the mirror ratio of the current mirror circuit CM1 is 1, K1=1 holds true, and accordingly, the following Expression (1a) holds true.

$$I1=V1/R1 \tag{1a}$$

The second V/I conversion circuit 12 and the third V/I conversion circuit 14 are each configured in the same manner as the first V/I conversion circuit 10. It should be noted that, with the second V/I conversion circuit (third V/I conversion circuit 14), the current mirror circuit CM2 (CM3) is configured including transistors M22 and M23 (M32 and M33). It should be noted that the current mirror circuits CM2 and CM3 are each configured as a cascode current mirror circuit. Conversely, the current mirror circuit CM1 of the first V/I conversion circuit 10 may be configured in the same manner as the current mirror circuits CM2 and CM3. In a case in which the current mirror circuits CM2 and CM3 each have a mirror ratio of 1, the following Expressions (2a) and (3a) hold true.

$$I2=V2/R2 \tag{2a}$$

$$I3=V_{BGR}/R3 \tag{3a}$$

The first error amplification circuit 18 includes an error amplifier EA1, an output buffer 19, a first current source CS1, and a second current source CS2.

The error amplifier EA1 is configured to amplify the difference between the reference voltage $V_{REF}$ and the first detection voltage $V_S$. The output buffer 19 has a push-pull configuration, and is configured to generate the second voltage V2 that corresponds to the output of the error amplifier EA1.

When the first detection voltage $V_S$ is lower than a predetermined first threshold voltage $V_{TH1}$, the first current source CS1 is set to the on state. The first threshold voltage $V_{TH1}$ is preferably set to be a value that is lower than the reference voltage $V_{REF}$, e.g., is preferably set to be a value on the order of 15% lower than the reference voltage $V_{REF}$. In the on state, the first current source CS1 supplies current to the output terminal of the first error amplification circuit 18, thereby raising the second voltage V2. The rise of the second voltage V2 raises the output voltage $V_{DC}$ of the PFC circuit 200.

When the first detection voltage $V_S$ is higher than a predetermined second threshold voltage $V_{TH2}$, the second current source CS2 is turned on, which draws the current from the output terminal of the first error amplification circuit 18, thereby reducing the second voltage V2. The reduction in the second voltage V2 reduces the output voltage $V_{DC}$ of the PFC circuit 200.

The comparator CMP1 is configured to compare the first detection voltage $V_S$ with the threshold voltage and to generate a low-voltage lockout signal (VSUVLO signal) which is set to high level when $V_S>V_{TH1}$. When the VSUVLO signal is low level, the first current source CS1 is set to the on state. Moreover, the comparator CMP2 is configured to compare the first detection voltage $V_S$ with the predetermined threshold voltage $V_{TH2}$, and to generate an overvoltage protection signal (DOVP signal) which is set to high level when $V_S>V_{TH2}$. When the DOVP signal is high level, the second current source CS2 is set to the on state.

Figure 4:
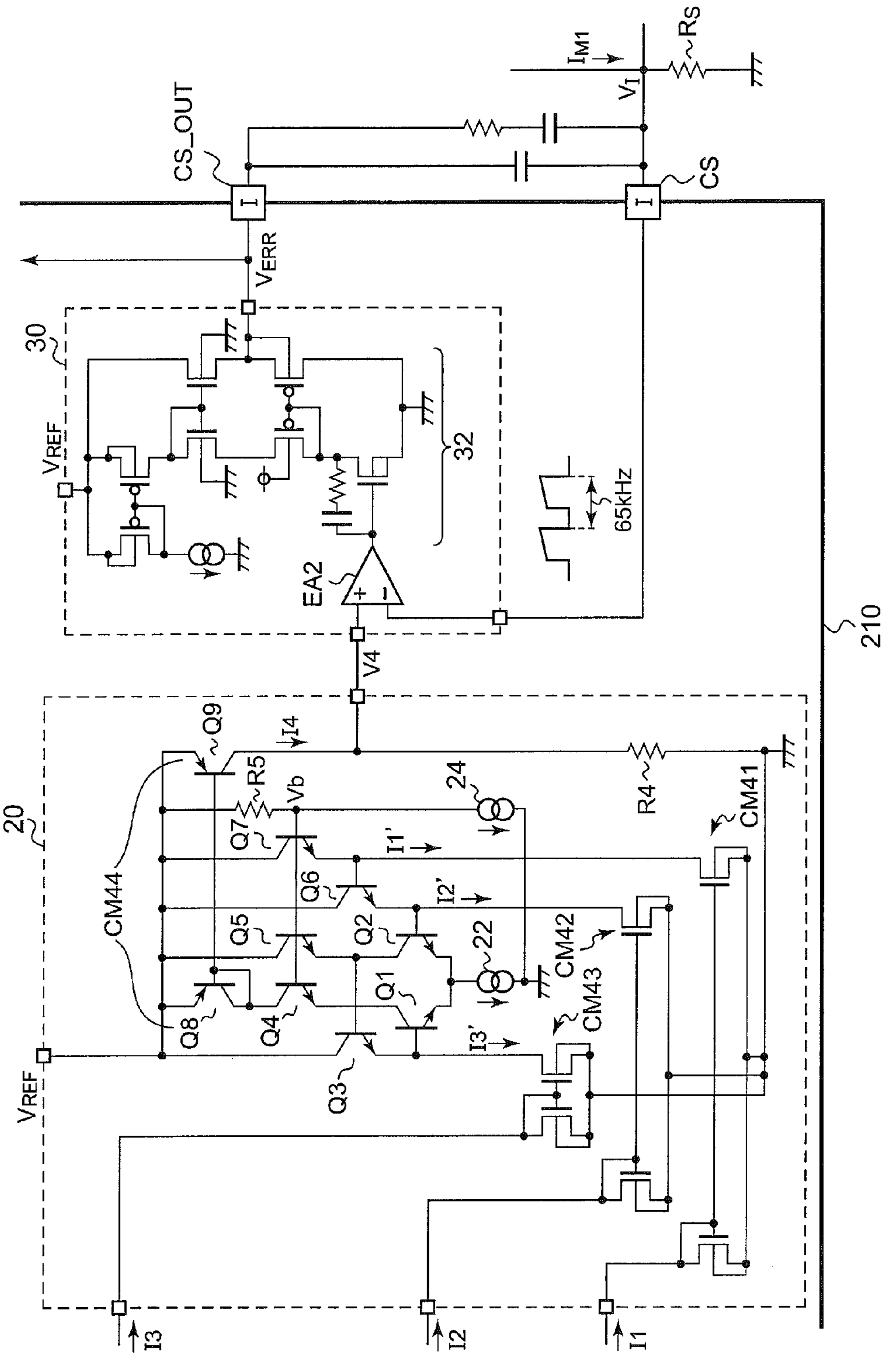
FIG. 4 is a circuit diagram which shows a part of the configuration of the control circuit.

FIG. 4 is a circuit diagram which shows a part of the configuration of the control circuit 210. The multiplier includes bipolar transistors Q1 through Q9, a current source 22, a resistor R5, and current mirror circuits CM41 through CM43, in addition to the fourth resistor R4.

The current mirror circuits CM41 through CM43 are configured to mirror the first current I1 through the third current I3, respectively. The transistors Q1, Q2, Q4, and Q5, and the current source 22 form a differential amplifier. The first transistor Q1 and the second transistor Q2 form a differential pair. The fourth transistor Q4 and the fifth transistor Q5 function as the loads of the first transistor Q1 and the second transistor Q2, respectively. The emitters of the transistors Q4 and Q5 are connected to the collectors of the transistors Q1 and Q2, respectively. The current source 22 is configured to supply a tail current to the differential pair (Q1, Q2).

The third transistor Q3 is arranged on a path of a current I3' that corresponds to the third current I3 such that its emitter is connected to the base of the first transistor Q1, and its base is connected to the collector of the second transistor Q2. The sixth transistor Q6 is arranged on a path of a current I2' that corresponds to the second current I2, such that its emitter is connected to the base of the second transistor Q2. The seventh transistor Q7 is arranged on a path of a current I1' that corresponds to the first current I1, such that its emitter is connected to the base of the sixth transistor Q6, and its base is biased to the same bias level as that of the fourth transistor Q4 and the fifth transistor Q5.

The eighth transistor Q8 and the ninth transistor Q9 form a current mirror circuit CM44, which is configured to mirror a current I4' ($=I_{C1}$) that flows through a path formed of the first transistor Q1 and the fourth transistor Q4, thereby generating the fourth current I4. The fourth resistor R4 is arranged on a path of the fourth current I4. A voltage drop $V_{R4}$ across the fourth resistor R4 is output as the fourth voltage V4.

With the base-emitter voltages of the first transistor Q1 through the seventh transistor Q7 as VF1 through VF7, respectively, and with the collector currents that flow through the respective transistors Q1 through Q7 as $I_{C1}$ through $I_{C7}$, respectively, the following Expression (5) holds true.

$$VF1+VF3+VF5=VF2+VF8+VF7 \tag{5}$$

The collector current that flows through the bipolar transistor is represented by the following Expression (6).

$$I_C \propto I_S \times \exp(V_F/V_T) \tag{6}$$

Here, $V_T$ represents kT/q, $I_S$ represents the saturation current, q represents the electron charge ($=1.602\times10^{-19}$ [C]), k represents the Boltzmann constant ($1.38\times10^{-23}$ [J/K]), and T represents the absolute temperature [(K)]. The following Expression (7) is obtained based upon the Expressions (5) and (6).

$$I_{C1}\times I_{C3}\times I_{C5}=I_{C2}\times I_{C6}\times C_7 \tag{7}$$

With such an arrangement, the transistors Q2 and Q5 are arranged on the same current path, and accordingly $I_{C2}=I_{C5}$ holds true. Thus, the following Expressions (8) and (9) are obtained.

$$I_{C1}\times I_{C3}=I_{C6}\times I_{C7} \tag{8}$$

$$I_{C1}=I_{C6}\times I_{C7}/I_{C3} \tag{9}$$

For simplicity of description, let us say that the current mirror circuits CM41 through CM43 each have a mirror ratio of 1. In this case, $I_{C7}$=I1'=I1, $I_{C6}$=I2'=I2, and $I_{C3}$=I3'=I3 hold true. Thus, the following Expression (10) is obtained.

$$I_{C1}=I2\times I1/I3 \tag{10}$$

In a case in which the current mirror circuit CM44, which comprises the transistors Q8 and Q9, has a mirror ratio of 1, the following Expression (11) is obtained using the current $I_{C1}$ that flows through the first transistor Q1.

$$I4=I_{C1}=I2\times I1/I3 \tag{11}$$

By substituting the Expressions (1a) through (3a) into the Expression (11), the following Expression (12) is obtained.

$$I4=(V1\times V2)/V3\times R3/(R1\times R2) \tag{12}$$

Based upon the Expression (4) and Expression (12), the following Expression (13) is obtained.

$$V4=(V1\times V2)/V3\times(R3\times R4)/(R1\times R2) \tag{13}$$

The second error amplification circuit 30 includes an error amplifier EA2 and output buffer 32, and is configured in the same manner as the first error amplification circuit 18 shown in FIG. 3.

The above is the configuration of the PFC circuit 200 according to the embodiment. Next, description will be made regarding the operation of the PFC circuit 200.

The first voltage V1 has the same full-wave rectified waveform as that of the AC voltage $V_{AC}$. The second voltage V2 and the third voltage V3 are each configured as a DC voltage. Thus, the fourth voltage V4 has a full-wave rectified waveform having the same phase as that of the AC voltage $V_{AC}$.

Furthermore, as described above, by means of the system including the second error amplification circuit 30, the duty ratio of the PWM signal $S_{PWM}$ is feedback controlled such that the envelope curve of the current $I_{M1}$ that flows through the switching transistor M1 matches the fourth voltage V4. Thus, the feedback operation is performed such that the current $I_{M1}$ that flows through the switching transistor M1 matches the AC voltage $V_{AC}$, and accordingly, the waveform and the phase of the input current $I_{AC}$ of the PFC circuit 200 match those of the AC voltage $V_{AC}$, thereby improving the power factor.

Description will be made directing attention to the aforementioned Expression (13). The resistances R1 through R4 are paired. Thus, even if the respective resistance values R1-R4 fluctuate due to temperature fluctuation or otherwise due to process variation (which will be collectively referred to as "temperature fluctuation, etc."), the resistance ratio is maintained at a constant value. That is to say, with regard to the term (R3×R4)/(R1×R2), the effect of temperature fluctuation, etc., on the denominator and its effect on the numerator cancel each other out, and accordingly, the value of this term is maintained at substantially the same value. That is to say, such an arrangement is capable of suppressing effects of temperature fluctuation, etc., on the fourth voltage V4, thereby suppressing the effects of temperature fluctuation, etc., on the waveform of the input current $I_{AC}$.

The PFC circuit 200 has yet another advantage described below.

The divided AC voltage $V_{BO}$ has a full-wave rectified waveform. Thus, the divided AC voltage $V_{BO}$ drops to substantially 0 V. If the AC voltage $V_{BO}$ is directly input to the first V/I conversion circuit 10, the voltage range of the AC voltage $V_{BO}$ deviates from the input voltage range of the operational amplifier OA1, leading to the operation of the operational amplifier OA1 in a dead band, which distorts the waveform of the first current I1 from that of an ideal full-wave rectified waveform. Such waveform distortion worsens the total harmonic distortion (THD). In contrast, with the control circuit 210 according to the embodiment, by providing the offset circuit 16, such an arrangement is capable of preventing the first V/I conversion circuit 10 from operating in the dead band, thereby improving the total harmonic distortion.

The PFC circuit 200 is required to respond to an envelope curve signal having a frequency on the order of 50 Hz to 60 Hz, leading to a very low response speed of the feedback loop. Accordingly, such a feedback control operation by means of only the error amplifiers EA1 and EA2 cannot suppress drops or rises in the output voltage $V_{DC}$ due to sharp fluctuations in the load. In contrast, with the control circuit 210 according to the embodiment, in the low-voltage state ($V_S<V_{TH1}$), the first current source CS1 is turned on, which raises the second voltage V2 with a quicker response than with the error amplifier EA1, thereby promptly raising the output voltage $V_{DC}$. Furthermore, in the overvoltage state ($V_S>V_{TH2}$), the second current source CS2 is turned on, which lowers the second voltage V2 with a quicker response than with the error amplifier EA1, thereby promptly reducing the output voltage $V_{DC}$.

Description has been made above regarding the present invention with reference to the embodiment. The above-described embodiment has been described for exemplary purposes only, and is by no means intended to be interpreted restrictively. Rather, it can be readily conceived by those skilled in this art that various modifications may be made by making various combinations of the aforementioned components or processes, which are also encompassed in the technical scope of the present invention. Description will be made below regarding such modifications.

Figure 5:
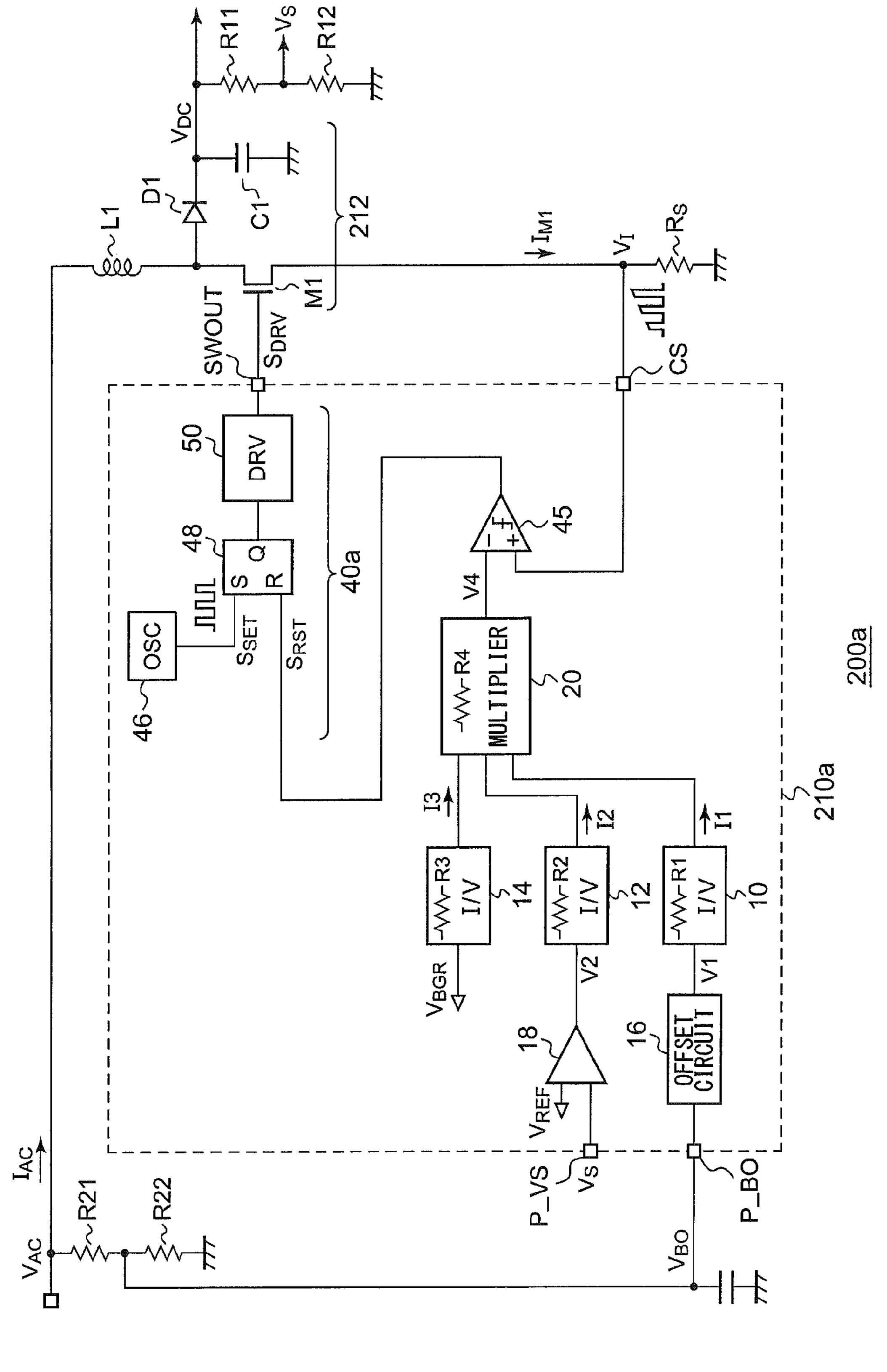
FIG. 5 is a circuit diagram which shows a first modification of the control circuit.

Description has been made with reference to FIG. 2 regarding the control circuit 210 configured to perform a so-called average current mode control operation. However, the present invention is not restricted to such an arrangement. Also, the present invention can be applied to an arrangement configured to perform a peak current mode control operation. FIG. 5 is a circuit diagram which shows a PFC circuit including a control circuit 210*a* according to a first modification. The control circuit 210*a* configured to perform a peak current mode control operation includes a comparator 45, instead of the second error amplification circuit 30 shown in FIG. 2. The comparator 45 is configured to compare the fourth voltage V4 with the second detection voltage $V_I$, and to output a reset signal $S_{RST}$ which is set to high level when $V_I$>V4. The reset signal $S_{RST}$ is input to the reset terminal of the RS flip-flop 48 of a driving circuit 40*a*. That is to say, the driving circuit 40*a* turns on the switching transistor M1 for each cycle according to the set signal $S_{SET}$ received from the oscillator 46, and turns off the switching transistor M1 according to the reset signal $S_{RST}$ every time the second detection voltage $V_I$ becomes higher than the fourth voltage V4.

With the control circuit 210*a* shown in FIG. 5, the feedback control is performed such that the peak value of the second detection voltage $V_I$, i.e., the peak value of the current $I_{M1}$ that flows through the switching transistor M1 matches the fourth voltage V4, thereby stabilizing the output voltage $V_{DC}$. The control circuit 210*a* configured to operate in such a peak current mode provides high efficiency as compared with an arrangement configured to operate in an average current mode.

Figure 6:
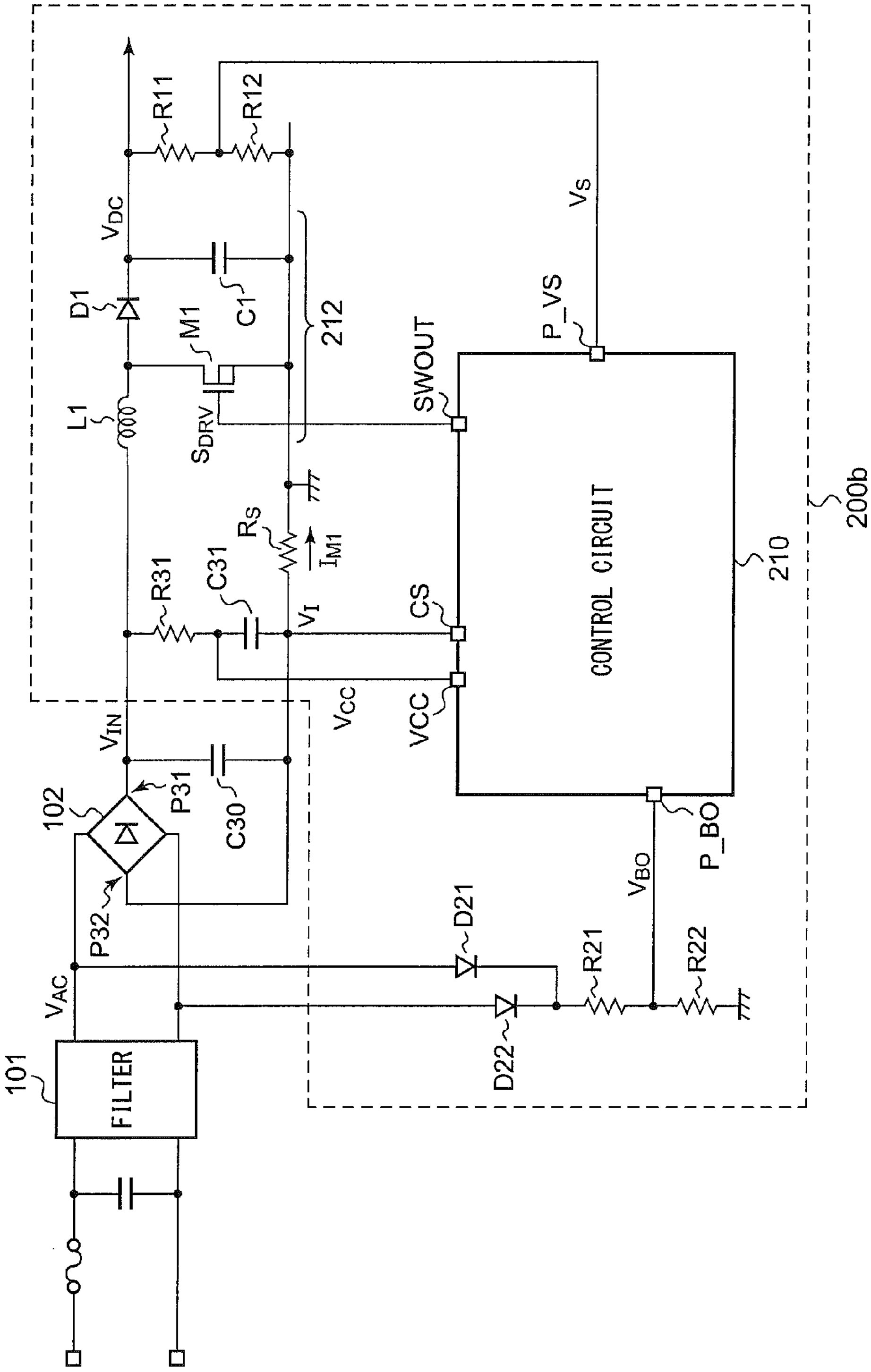
FIG. 6 is a circuit diagram which shows a configuration of a PFC circuit according to a second modification.

FIG. 6 is a circuit diagram which shows a PFC circuit 200*b* according to a second modification. A rectifier circuit 102 and a filter 101 are arranged at a previous stage of the PFC circuit 200*b*. It is needless to say that such a filter 101 may be arranged at a previous stage of the PFC circuit 200 described above with reference to FIG. 1.

The AC voltage $V_{AC}$ subjected to noise removal by the filter 101 is full-wave rectified by the rectifier circuit 102, and is smoothed by the smoothing capacitor C30. The voltage thus smoothed (which will be referred to as the "input voltage $V_{IN}$") is input to the PFC circuit 200*b*. With such a modification, the PFC circuit 200*b* operates as a DC/DC converter configured to convert a DC voltage into a DC voltage.

The PFC circuit 200*b* mainly includes a control circuit 210*b* and an output circuit 212. As such a control circuit 210*b*, the average current mode control circuit 210 shown in FIG. 2 or otherwise the peak current mode control circuit 210*a* may be employed.

A resistor R31 and a capacitor C31 are arranged in series, and are arranged in parallel with the capacitor C30. The voltage Vcc at a connection node that connects the resistor R31 and the capacitor C31 is supplied to the power supply terminal VCC of the control circuit 210.

The detection resistor $R_S$ is arranged between the source of the switching transistor M1 and an output terminal P32 of the rectifier circuit 102. The current that flows through the switching transistor M1, i.e., the current $I_{M1}$ that corresponds to the input current of the PFC circuit 200*b*, flows through the detection resistor R. Accordingly, the second detection voltage $V_I$ (voltage drop), which corresponds to the current $I_{M1}$ that flows through the switching transistor M1, occurs between both terminals of the detection resistor $R_S$. The second detection voltage $V_I$ is input as a feedback signal to the current detection terminal (CS terminal) of the control circuit 210. It should be noted that the detection resistor $R_S$ may be arranged between the source of the switching transistor M1 and the ground terminal in the same way as with the above-described embodiment. Conversely, in the above-described embodiment, such a detection resistor $R_S$ may be arranged at the same position as that shown in FIG. 6.

The diodes D21 and D22 are configured to perform full-wave rectification of the commercial AC voltage $V_{AC}$ input to the rectifier circuit 102. The AC voltage $V_{BO}$ thus full-wave rectified is divided by the resistors R21 and R22, and the voltage thus divided is input to the input voltage detection terminal (P_BO terminal) of the control circuit 210.

The above is the configuration of the PFC circuit 200*b* according to the second modification. Such a second modification provides the same advantages as those of the PFC circuit 200 according to the embodiment.

Second Embodiment

Description has been made in the first embodiment regarding a technique for improving the temperature characteristics. Description will be made in a second embodiment regarding a technique for suppressing an increase in the maximum power consumption due to an increase in the input electric power of the PFC circuit, according to a combination of the first embodiment and the second embodiment, or otherwise according to the second embodiment alone.

Figure 7:
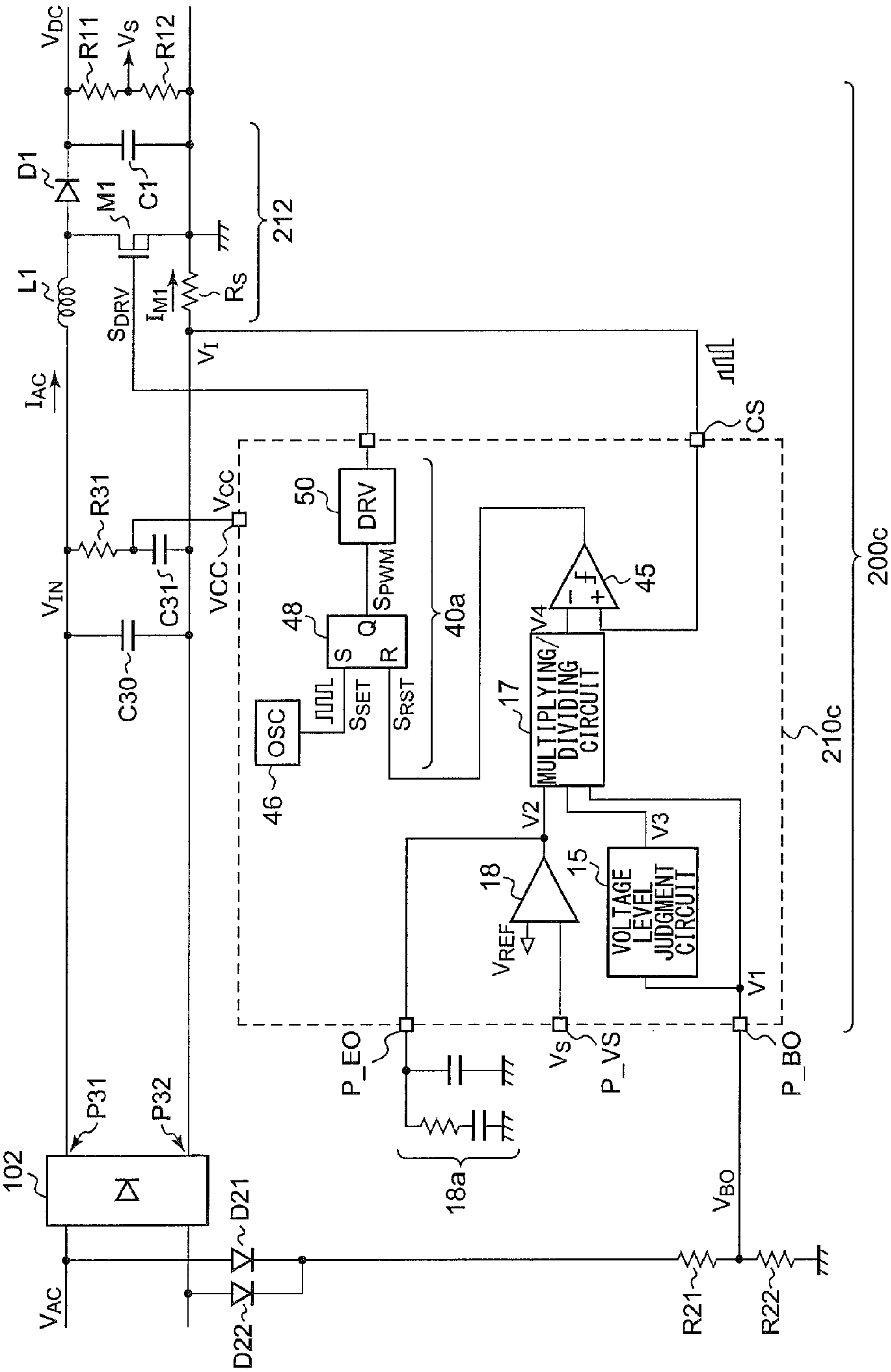
FIG. 7 is a circuit diagram which shows a configuration of a PFC circuit according to a second embodiment.

FIG. 7 is a circuit diagram which shows a configuration of a PFC circuit 200*c* including a control circuit 210*c* according to the second embodiment. A peripheral circuit of the control circuit 210*c* has the same configuration as that shown in FIG. 6, and accordingly, description thereof will be omitted. It should be noted that the peripheral circuit of the control circuit 210*c* may be configured in the same way as shown in FIG. 5.

Description will be made below regarding a specific configuration of the control circuit 210*c*. The control circuit 210*c*, which is configured to operate in the peak current mode, includes a voltage level judgment circuit 15, a first error amplification circuit 18, a multiplying/dividing circuit 17, a comparator 45, and a driving circuit 40*a*.

The first error amplification circuit 18 is configured to amplify the difference between a first detection voltage $V_S$ that corresponds to the output voltage $V_{DC}$ of the DC/DC converter and a predetermined reference voltage $V_{REF}$ so as to generate a second voltage V2. The output terminal of the first error amplification circuit 18 is connected to a P_EO terminal. A phase compensation circuit 18*a*, which includes a capacitor and a resistor, is connected to the P_EO terminal.

The voltage level judgment circuit 15 is configured to receive a first voltage V1 that corresponds to the voltage $V_{BO}$ input to the P_BO terminal, to judge the level of the amplitude Vamp of the first voltage V1, and to generate a third voltage V3 having a discrete level that corresponds to the judged level. For example, when Vamp<Vth1, the third voltage V3 is set to a first level Va. When Vth1<Vamp<Vth2, the third voltage V3 is set to the second level Vb. When Vth2<Vamp<Vth3, the third voltage V3 is set to the third level Vc. When Vth3<Vamp, the third voltage V3 is set to the fourth level Vd. Here, Va, Vb, Vc, and Vd are determined such that Va<Vb<Vc<Vd.

The multiplying/dividing circuit 17 is configured to multiply the first voltage V1 by the second voltage V2, and to divide the resulting product by the third voltage V3, so as to generate the fourth voltage V4. That is to say, the following Expression holds true.

$$V4=K4\times V1\cdot V2/V3 \quad (14)$$

Here, K4 represents a constant. The multiplying/dividing circuit 17 may be configured employing a combination of the first V/I conversion circuit 10, the second V/I conversion circuit 12, the third V/I conversion circuit 14, and the multiplier 20, as described in the first embodiment. In this case, such an arrangement provides the advantage of improved temperature characteristics as in the first embodiment. It should be noted that the configuration of the multiplying/dividing circuit 17 is not restricted to such an arrangement. Also, other configurations may be employed.

The other configuration of the control circuit 210*c* is the same as that of the control circuit 210*a* shown in FIG. 5, configured to operate in the peak current mode. The control circuit 210*c* shown in FIG. 7 may include the offset circuit 16.

Figure 8:
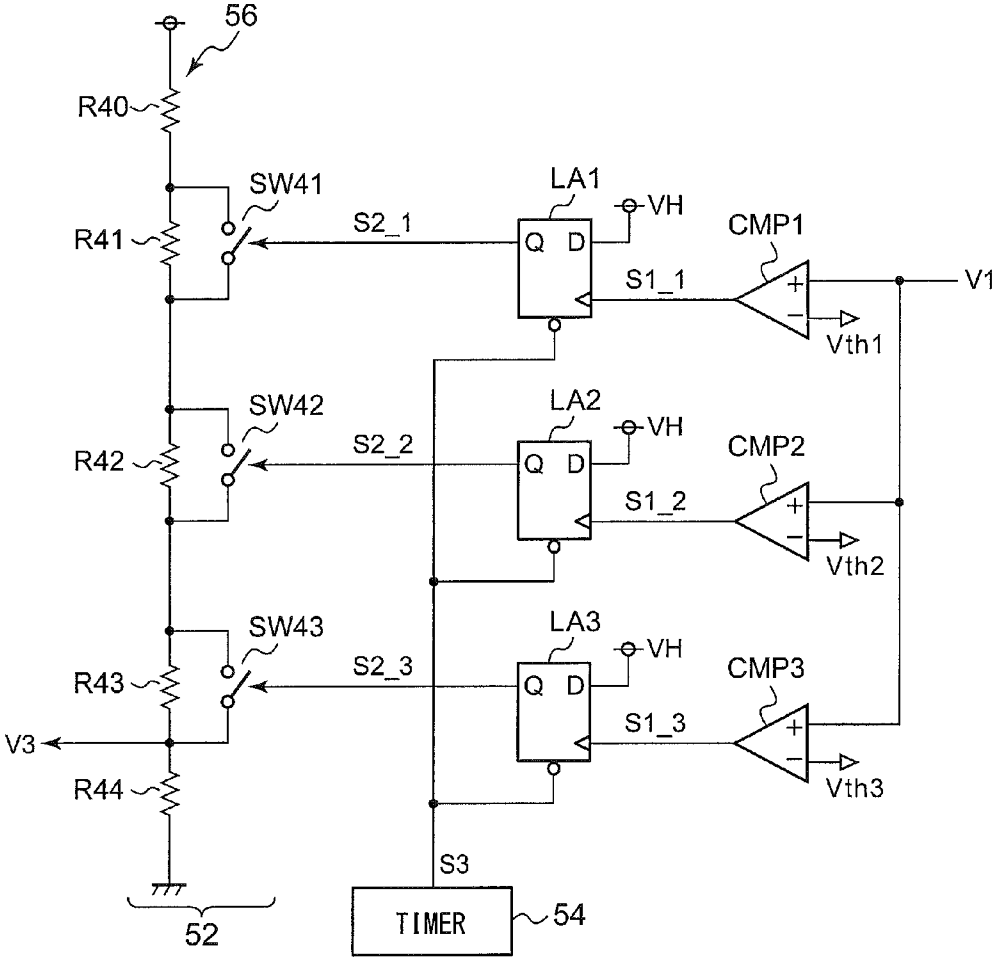
FIG. 8 is a circuit diagram which shows an example configuration of a voltage level judgment circuit shown in FIG. 7.

FIG. 8 is a circuit diagram which shows an example configuration of the voltage level judgment circuit 15 shown in FIG. 7.

The voltage level judgment circuit 15 includes multiple comparators CMP1 through CMP3, multiple latch circuits LA1 through LA3, and a voltage generating unit 52.

The i-th comparator CMPi is configured to generate a comparison signal S1_i which is asserted (set to high level) when the first voltage V1 is higher than the corresponding threshold voltage Vthi.

When the corresponding comparison signal S1_i is asserted, the i-th latch circuit LAi latches this state. The states of the multiple latch circuits LA1 through LA3 are each reset for each predetermined period defined by the timer circuit 54. The predetermined period T1 is preferably set to be longer the half the period of the AC voltage $V_{AC}$. For example, in a case in which an AC voltage $V_{AC}$ of 50 Hz is employed, the period of the AC voltage $V_{AC}$ is 20 ms, and accordingly, the predetermined period T1 is set to be longer than 10 ms.

The voltage generating unit 52 is configured to generate the third voltage V3 having a level that corresponds to the states of the multiple latch circuits LA1 through LA3. For example, the voltage generating unit 52 may include a resistor string 56 that comprises multiple resistors R40 through R44 connected in series and switches SW41 through SW43 respectively connected in parallel with the resistors R41 through R43. When the output signal S2_i of the corresponding latch circuit LAi is high level, the i-th switch SW4*i* is turned on, and when the output signal S2_i is low level, the switch SW4*i* is turned off. The voltage level of the third voltage V3 generated by the voltage generating unit 52 is increased according to an increase in the amplitude of the first voltage V1. The numbers of such comparators, latch circuits, and resistors are preferably determined according to the number of switchable levels of the third voltage V3, which will be clearly understood by those skilled in this art.

It should be noted that the configuration of the voltage generating unit 52 is not restricted in particular, as long as it is capable of generating the third voltage having a level which represents the states of the multiple latch circuits.

Figure 9:
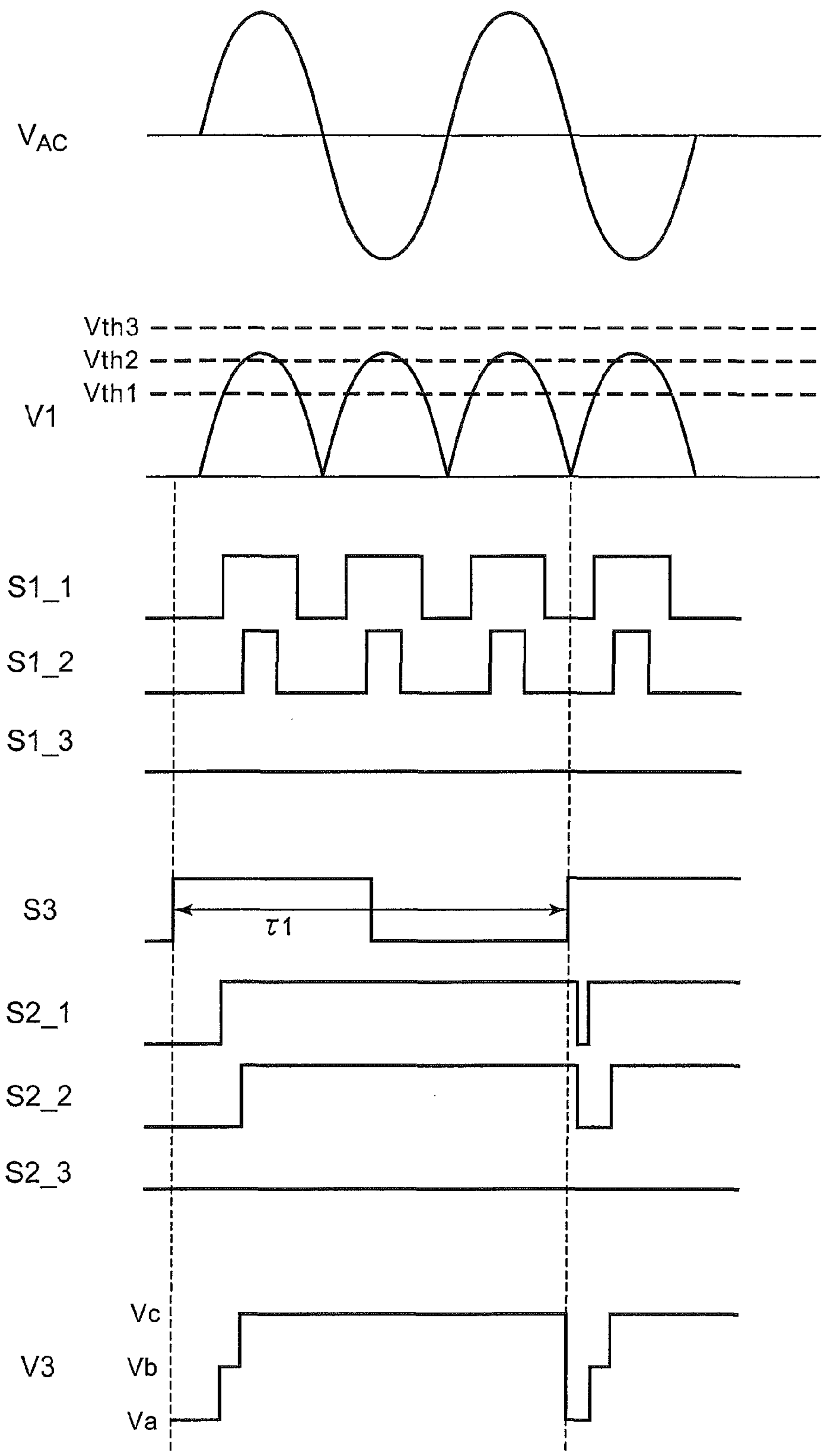
FIG. 9 is a diagram which shows the operation of the voltage level judgment circuit shown in FIG. 8.

FIG. 9 is a diagram which shows the operation of the voltage level judgment circuit 15 shown in FIG. 8. With such an example shown in FIG. 9, the amplitude level of the first voltage V1 satisfies the relation Vth2<Vamp<Vth3, and accordingly, the level of the third voltage V3 is set to the third level Vc.

It should be noted that the voltage level judgment circuit 15 preferably sets the third voltage V3 to the highest level Vd during a period starting from the start-up of the PFC circuit 200*c*. Such an arrangement is capable of suppressing the maximum power consumption during a given period immediately after the PFC circuit 200*c* starts up regardless of the amplitude level of the first voltage V1 (AC voltage $V_{AC}$). This means that such an arrangement limits the current that flows through the switching transistor M1, thereby providing a so-called soft-start operation in which the output voltage $V_{DC}$ of the PFC circuit 200*c* rises at a slow rate.

The above is the configuration of the control circuit 210*c*. Next, description will be made regarding the operation of the PFC circuit 200*c* shown in FIG. 7.

The maximum power consumption P of the PFC circuit 200*c* shown in FIG. 7 is represented by the following Expression (15). Here, L represents the inductance of the inductor L1, $I_L$ represents the current that flows through the inductor L1, and $f_{SW}$ represents the switching frequency of the switching transistor M1.

$$P_{MAX}=\tfrac{1}{2}\times L\times I_L^2\times f_{SW} \quad (15)$$

The current $I_L$ that flows through the inductor L1 is represented by the following Expression (16) using a coefficient K5.

$$I_L=(V4/R_S)\times K5 \quad (16)$$

By substituting the Expression (14) into the Expression (16), the following Expression (16)' is obtained.

$$I_L=(K4\times V1\times V2/V3)/R_S\times K5=\alpha\times V1\times V2/V3 \quad (16)'$$

By substituting Expression (16)' into Expression (15), the following Expression (17) is obtained.

$$P_{MAX}=\tfrac{1}{2}\times L\times(\alpha\times V1\times V2/V3)^2\times f_{SW} \quad (17)$$

Figure 10:
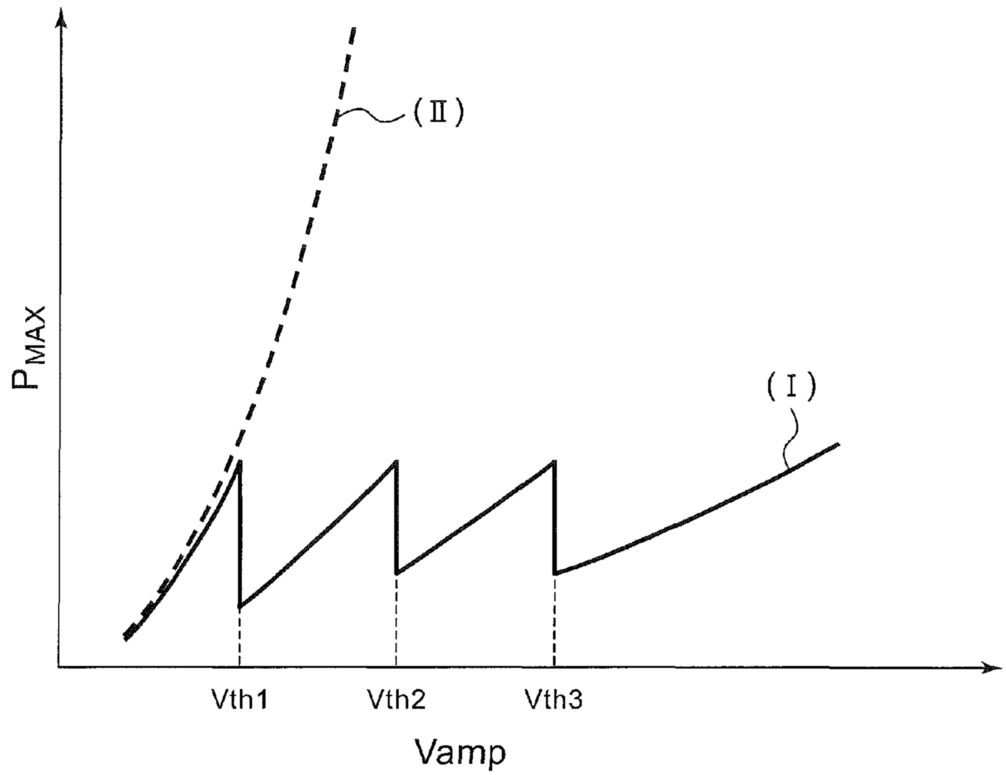
FIG. 10 is a graph which shows the relation between the amplitude of the first voltage and the maximum power consumption in the PFC circuit shown in FIG. 7.

FIG. 10 is a graph which shows the relation between the amplitude Vamp of the first voltage V1 and the maximum power consumption $P_{MAX}$ in the PFC circuit 200*c* shown in FIG. 7.

As indicated by the solid line (II), in a case in which the third voltage V3 is configured as a fixed voltage, the maximum power consumption P increases in proportion to the square of $V_{AC}$ according to an increase in the amplitude Vamp of the first voltage V1, i.e., according to an increase in the AC voltage $V_{AC}$. In contrast, with the PFC circuit 200*c* shown in FIG. 7, as indicated by the solid line (I), by increasing the third voltage V3 according to the amplitude Vamp, such an arrangement is capable of suppressing a limitless increase in the maximum power consumption P.

Furthermore, such an arrangement allows the designer of the PFC circuit 200 to determine the respective threshold voltages Vth1 through Vth3 and the respective voltage levels Va through Vd of the third voltage V3. Thus, such an arrangement allows the horizontal direction of the relational curve indicated by the solid line (I) to be adjusted by adjusting the threshold voltages Vth1 through Vth3. Also, such an arrangement allows the vertical direction of the relational curve indicated by the solid line (I) to be adjusted by adjusting the voltage levels Va through Vd.

Figure 11:
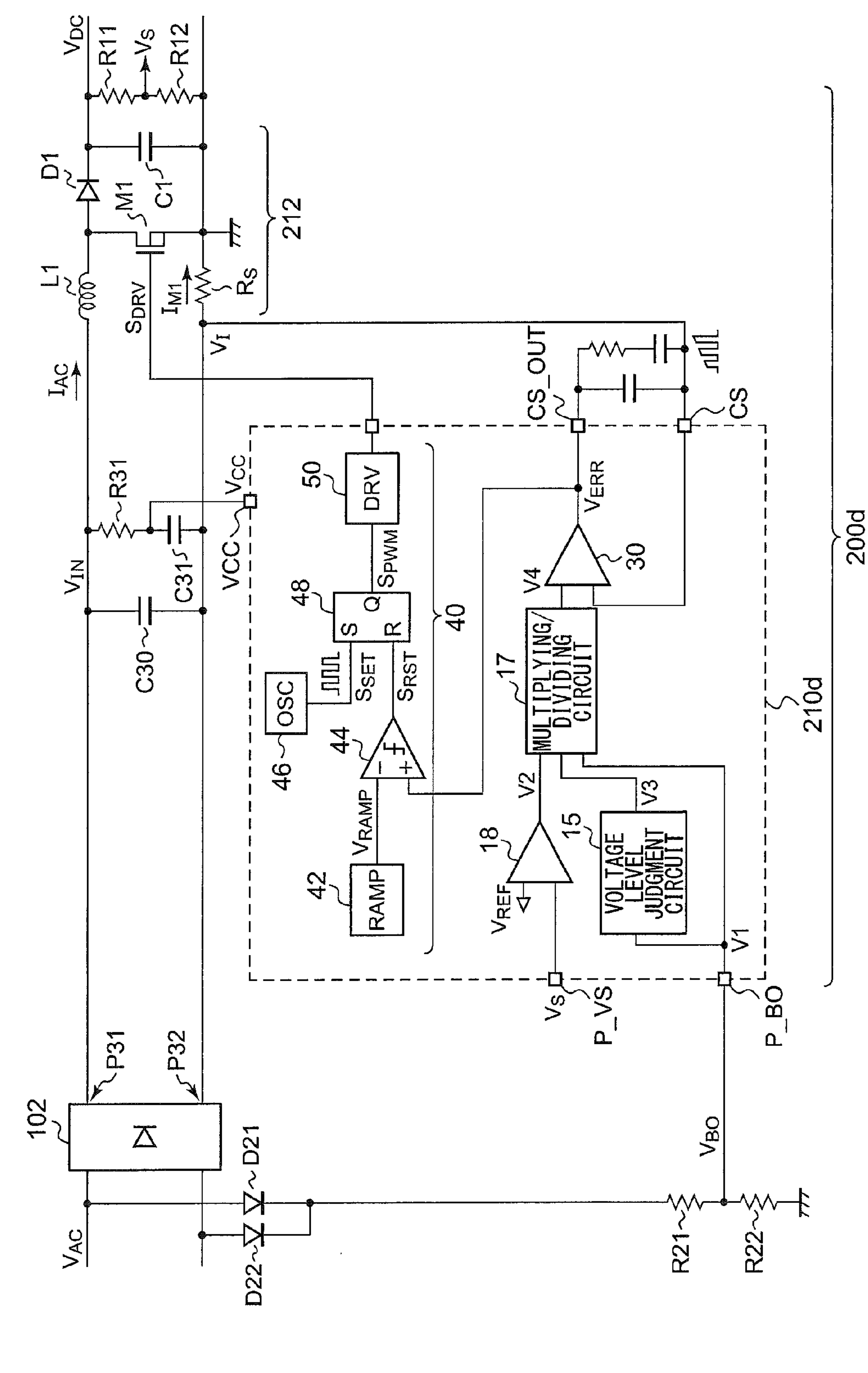
FIG. 11 is a circuit diagram which shows a modification of the PFC circuit shown in FIG. 7.

The above is the description of the PFC circuit 200*c* according to the second embodiment. The PFC circuit 200*c* shown in FIG. 7 is configured as a peak current mode PFC circuit. Also, the present embodiment can be applied to an average current mode PFC circuit. FIG. 11 is a circuit diagram which shows a modification of the PFC circuit shown in FIG. 7. A PFC circuit 200*d* shown in FIG. 11 includes an average current mode control circuit 210*d*. The peripheral circuit of the control circuit 210*d* has the same configuration as that shown in FIG. 6, and accordingly, description thereof will be omitted. It should be noted that the peripheral circuit of the control circuit 210*d* may be configured in the same way as shown in FIG. 2. The control circuit 210*d* includes a voltage level judgment circuit 15 instead of the third V/I conversion circuit 14 included in the control circuit 210 shown in FIG. 2.

With such an average current mode control circuit 210*d*, such an arrangement is also capable of suppressing a limitless increase in the maximum power consumption P as shown in FIG. 10.

Description has been made in the embodiment regarding an arrangement in which the DC/DC converter 100 is mounted on the electronic device 1. However, the present invention is not restricted to such an arrangement. Rather, the present invention can be applied to various kinds of power supply apparatuses. For example, the DC/DC converter 100 is applicable to an AC adapter configured to supply electric power to an electronic device. Examples of such an electronic device include laptop computers, desktop computers, cellular phone terminals, CD players, and so forth, which are not restricted in particular.

While the preferred embodiments of the present invention have been described using specific terms, such description is for illustrative purposes only, and it is to be understood that changes and variations may be made without departing from the spirit or scope of the appended claims.

What is claimed is:

1. A control circuit for a power factor correction circuit that comprises a DC/DC converter, the control circuit comprising:

an input voltage detection terminal configured to receive a first voltage having a full-wave rectified waveform;

a first error amplification circuit configured to amplify a difference between a predetermined reference voltage and a first detection voltage that corresponds to an output voltage of the DC/DC converter so as to generate a second voltage;

a voltage level judgment circuit configured to generate a third voltage having a discrete level that corresponds to an amplitude level of the first voltage;

a multiplying/dividing circuit configured to multiply the first voltage by the second voltage, and to divide the resulting product by the third voltage, so as to generate a fourth voltage;

a comparator configured to make a comparison between the fourth voltage and a second detection voltage that corresponds to a current that flows through a switching transistor included in the DC/DC converter; and a driving circuit configured to turn on the switching transistor for each predetermined period, and to turn off the switching transistor according to an output signal of the comparator every time the second detection voltage becomes higher than the fourth voltage, wherein the multiplying/dividing circuit comprises:

a first voltage/current conversion circuit configured to apply the first voltage to a first resistor so as to generate a first current;

a second voltage/current conversion circuit configured to apply the second voltage to a second resistor so as to generate a second current;

a third voltage/current conversion circuit configured to apply a predetermined voltage to a third resistor so as to generate a third current; and a multiplier configured to generate a fourth current by multiplying the first current by the second current, and by dividing the resulting product by the third current, and to apply the resulting fourth current to a fourth resistor, so as to generate a fourth voltage.

2. The control circuit according to claim 1, wherein the multiplier comprises:

a differential amplifier comprising a differential pair formed of a first bipolar transistor and a second bipolar transistor, a fourth bipolar transistor and a fifth bipolar transistor arranged such that the respective emitters thereof are connected to the corresponding collectors of the first and second bipolar transistors, and a current source configured to supply a tail current to the differential pair;

a third bipolar transistor arranged on a path of a current that corresponds to the third current, such that its emitter is connected to the base of the first bipolar transistor, and its base is connected to the collector of the second bipolar transistor;

a sixth bipolar transistor arranged on a path of a current that corresponds to the second current, such that its emitter is connected to the base of the second bipolar transistor; and a seventh bipolar transistor arranged on a path of a current that corresponds to the first current, such that its emitter is connected to the base of the sixth bipolar transistor, and its base is biased to the same bias level as that of the fourth and fifth bipolar transistors, and wherein the multiplier is configured to generate the fourth current according to a current that flows through the first and fourth bipolar transistors, and wherein the fourth resistor is arranged on a path of the fourth current.

3. The control circuit according to claim 1, wherein the voltage level judgment circuit is configured to set the third voltage to its highest level during a period starting from the start-up operation.

4. A control circuit for a power factor correction circuit that comprises a DC/DC converter, the control circuit comprising:
- an input voltage detection terminal configured to receive a first voltage having a full-wave rectified waveform;
- a first error amplification circuit configured to amplify a difference between a predetermined reference voltage and a first detection voltage that corresponds to an output voltage of the DC/DC converter so as to generate a second voltage;
- a voltage level judgment circuit configured to generate a third voltage having a discrete level that corresponds to an amplitude level of the first voltage;
- a multiplying/dividing circuit configured to multiply the first voltage by the second voltage, and to divide the resulting product by the third voltage, so as to generate a fourth voltage;
- a comparator configured to make a comparison between the fourth voltage and a second detection voltage that corresponds to a current that flows through a switching transistor included in the DC/DC converter; and
- a driving circuit configured to turn on the switching transistor for each predetermined period, and to turn off the switching transistor according to an output signal of the comparator every time the second detection voltage becomes higher than the fourth voltage, wherein the multiplying/dividing circuit comprises:
- a first voltage/current conversion circuit configured to generate a first current that is proportional to the first voltage;
- a second voltage/current conversion circuit configured to generate a second current that is proportional to the second voltage;
- a third voltage/current conversion circuit configured to generate a third current that is proportional to the third voltage; and
- a multiplier configured to multiply the first current by the second current, to divide the resulting product by the third current so as to generate a fourth current, and to generate the fourth voltage that is proportional to the fourth current.

5. The control circuit according to claim 4, wherein the multiplier comprises:
- a differential amplifier comprising a differential pair formed of a first bipolar transistor and a second bipolar transistor, a fourth bipolar transistor and a fifth bipolar transistor arranged such that the respective emitters thereof are connected to the corresponding collectors of the first and second bipolar transistors, and a current source configured to supply a tail current to the differential pair;
- a third bipolar transistor arranged on a path of a current that corresponds to the third current, such that its emitter is connected to the base of the first bipolar transistor, and its base is connected to the collector of the second bipolar transistor;
- a sixth bipolar transistor arranged on a path of a current that corresponds to the second current, such that its emitter is connected to the base of the second bipolar transistor; and
- a seventh bipolar transistor arranged on a path of a current that corresponds to the first current, such that its emitter is connected to the base of the sixth bipolar transistor, and its base is biased to the same bias level as that of the fourth and fifth bipolar transistors,
- and wherein the multiplier is configured to generate the fourth current according to a current that flows through the first and fourth bipolar transistors.

6. A control circuit for a power factor correction circuit that comprises a DC/DC converter, the control circuit comprising:
- an input voltage detection terminal configured to receive a first voltage having a full-wave rectified waveform;
- a first error amplification circuit configured to amplify a difference between a predetermined reference voltage and a first detection voltage that corresponds to an output voltage of the DC/DC converter so as to generate a second voltage;
- a voltage level judgment circuit configured to generate a third voltage having a discrete level that corresponds to an amplitude level of the first voltage;
- a multiplying/dividing circuit configured to multiply the first voltage by the second voltage, and to divide the resulting product by the third voltage, so as to generate a fourth voltage;
- a comparator configured to make a comparison between the fourth voltage and a second detection voltage, that corresponds to a current that flows through a switching transistor included in the DC/DC converter; and
- a driving circuit configured to turn on the switching transistor for each predetermined period, and to turn off the switching transistor according to an output signal of the comparator every time the second detection voltage becomes higher than the fourth voltage, wherein the voltage level judgment circuit comprises:
- a plurality of comparators each configured to generate a comparison signal which is asserted when the first voltage is higher than its predetermined threshold voltage;
- a plurality of latch circuits each configured to latch its state when the corresponding comparison signal is asserted, and to be reset for each predetermined period; and
- a voltage generating unit configured to generate the third voltage having a level that corresponds to the states of the plurality of latch circuits.

7. A power factor correction circuit comprising:
- a DC/DC converter comprising a switching transistor; and
- a control circuit configured to drive the switching transistor, wherein
- the control circuit comprises:
- an input voltage detection terminal configured to receive a first voltage having a full-wave rectified waveform;
- a first error amplification circuit configured to amplify a difference between a predetermined reference voltage and a first detection voltage that corresponds to an output voltage of the DC/DC converter so as to generate a second voltage;
- a voltage level judgment circuit configured to generate a third voltage having a discrete level that corresponds to an amplitude level of the first voltage;
- a multiplying/dividing circuit configured to multiply the first voltage by the second voltage, and to divide the resulting product by the third voltage, so as to generate a fourth voltage;
- a comparator configured to make a comparison between the fourth voltage and a second detection voltage that corresponds to a current that flows through a switching transistor included in the DC/DC converter; and
- a driving circuit configured to turn on the switching transistor for each predetermined period, and to turn off the switching transistor according to an output signal of the comparator every time the second detection voltage becomes higher than the fourth voltage,
- wherein the multiplying/dividing circuit comprises:
- a first voltage/current conversion circuit configured to apply the first voltage to a first resistor so as to generate a first current;

a second voltage/current conversion circuit configured to apply the second voltage to a second resistor so as to generate a second current;

a third voltage/current conversion circuit configured to apply a predetermined voltage to a third resistor so as to generate a third current; and a multiplier configured to generate a fourth current by multiplying the first current by the second current, and by dividing the resulting product by the third current, and to apply the resulting fourth current to a fourth resistor, so as to generate a fourth voltage.

8. An electronic device comprising:

a rectifier circuit configured to perform full-wave rectification of a commercial AC voltage;

a factor correction circuit configured to receive an output voltage of the rectifier circuit; and a first DC/DC converter configured to receive an output voltage of the power factor correction circuit, to step up or otherwise step down the output voltage, and to output the output voltage thus stepped up or otherwise stepped down to a load, wherein the power factor correction circuit comprises:

a second DC/DC converter comprising a switching transistor; and a control circuit configured to drive the switching transistor, wherein the control circuit comprises:

an input voltage detection terminal configured to receive a first voltage having a full-wave rectified waveform;

a first error amplification circuit configured to amplify a difference between a predetermined reference voltage and a first detection voltage that corresponds to an output voltage of the second DC/DC converter so as to generate a second voltage;

a voltage level judgment circuit configured to generate a third voltage having a discrete level that corresponds to an amplitude level of the first voltage;

a multiplying/dividing circuit configured to multiply the first voltage by the second voltage, and to divide the resulting product by the third voltage, so as to generate a fourth voltage;

a comparator configured to make a comparison between the fourth voltage and a second detection voltage that corresponds to a current that flows through a switching transistor included in the second DC/DC converter; and a driving circuit configured to turn on the switching transistor for each predetermined period, and to turn off the switching transistor according to an output signal of the comparator every time the second detection voltage becomes higher than the fourth voltage, wherein the multiplying/dividing circuit comprises:

a first voltage/current conversion circuit configured to apply the first voltage to a first resistor so as to generate a first current;

a second voltage/current conversion circuit configured to apply the second voltage to a second resistor so as to generate a second current;

a third voltage/current conversion circuit configured to apply a predetermined voltage to a third resistor so as to generate a third current; and a multiplier configured to generate a fourth current by multiplying the first current by the second current, and by dividing the resulting product by the third current, and to apply the resulting fourth current to a fourth resistor, so as to generate a fourth voltage.

9. A control circuit for a power factor correction circuit that comprises a DC/DC converter, the control circuit comprising:

an input voltage detection terminal configured to receive a first voltage having a full-wave rectified waveform;

a first error amplification circuit configured to amplify a difference between a predetermined reference voltage and a first detection voltage that corresponds to an output voltage, of the DC/DC converter so as to generate a second voltage;

a voltage level judgment circuit configured to generate a third voltage having a discrete level that corresponds to an amplitude level of the first voltage;

a multiplying/dividing circuit configured to multiply the first voltage by the second voltage, and to divide the resulting product by the third voltage, so as to generate a fourth voltage;

a second error amplification circuit configured to amplify a difference between the fourth voltage and a second detection voltage so as to generate an error signal, wherein the second detection voltage, corresponds to a current that flows through a switching transistor included in the DC/DC converter; and a driving circuit configured to drive the switching transistor according to the error signal, wherein the multiplying/dividing circuit comprises:

a first voltage/current conversion circuit configured to apply the first voltage to a first resistor so as to generate a first current;

a second voltage/current conversion circuit configured to apply the second voltage to a second resistor so as to generate a second current;

a third voltage/current conversion circuit configured to apply a predetermined voltage to a third resistor so as to generate a third current; and a multiplier configured to generate a fourth current by multiplying the first current by the second current, and by dividing the resulting product by the third current, and to apply the resulting fourth current to a fourth resistor, so as to generate a fourth voltage.

10. The control circuit according to claim 9, wherein the multiplier comprises:

a differential amplifier comprising a differential pair formed of a first bipolar transistor and a second bipolar transistor, a fourth bipolar transistor and a fifth bipolar transistor arranged such that the respective emitters thereof are connected to the corresponding collectors of the first and second bipolar transistors, and a current source configured to supply a tail current to the differential pair;

a third bipolar transistor arranged on a path of a current that corresponds to the third current, such that its emitter is connected to the base of the first bipolar transistor, and its base is connected to the collector of the second bipolar transistor;

a sixth bipolar transistor arranged on a path of a current that corresponds to the second current, such that its emitter is connected to the base of the second bipolar transistor; and a seventh bipolar transistor arranged on a path of a current that corresponds to the first current, such that its emitter is connected to the base of the sixth bipolar transistor, and its base is biased to the same bias level as that of the fourth and fifth bipolar transistors, and wherein the multiplier is configured to generate the fourth current according to a current that flows through the first and fourth bipolar transistors, and wherein the fourth resistor is arranged on a path of the fourth current.

11. The control circuit according to claim 9, wherein the voltage level judgment circuit is configured to set the third voltage to the highest level during a period starting from a start-up operation.

12. A control circuit for a power factor correction circuit that comprises a DC/DC converter, the control circuit comprising:

an input voltage detection terminal configured to receive a first voltage having a full-wave rectified waveform;

a first error amplification circuit configured to amplify a difference between a predetermined reference voltage and a first detection voltage that corresponds to an output voltage of the DC/DC converter so as to generate a second voltage;

a voltage level judgment circuit configured to generate a third voltage having a discrete level that corresponds to an amplitude level of the first voltage;

a multiplying/dividing circuit configured to multiply the first voltage by the second voltage, and to divide the resulting product by the third voltage, so as to generate a fourth voltage;

a second error amplification circuit configured to amplify a difference between the fourth voltage and a second detection voltage so as to generate an error signal, wherein the second detection voltage corresponds to a current that flows through a switching transistor included in the DC/DC converter; and a driving circuit configured to drive the switching transistor according to the error signal, wherein the multiplying/dividing circuit comprises:

a first voltage/current conversion circuit configured to generate a first current that is proportional to the first voltage;

a second voltage/current conversion circuit configured to generate a second current that is proportional to the second voltage;

a third voltage/current conversion circuit configured to generate a third current that is proportional to the third voltage; and a multiplier configured to multiply the first current by the second current, to divide the resulting product by the third current so as to generate a fourth current, and to generate the fourth voltage that is proportional to the fourth current.

13. The control circuit according to claim 12, wherein the multiplier comprises:

a differential amplifier comprising a differential pair formed of a first bipolar transistor and a second bipolar transistor, a fourth bipolar transistor and a fifth bipolar transistor arranged such that the respective emitters thereof are connected to the corresponding collectors of the first and second bipolar transistors, and a current source configured to supply a tail current to the differential pair;

a third bipolar transistor arranged on a path of a current that corresponds to the third current, such that its emitter is connected to the base of the first bipolar transistor, and its base is connected to the collector of the second bipolar transistor;

a sixth bipolar transistor arranged on a path of a current that corresponds to the second current, such that its emitter is connected to the base of the second bipolar transistor; and a seventh bipolar transistor arranged on a path of a current that corresponds to the first current, such that its emitter is connected to the base of the sixth bipolar transistor, and its base is biased to the same bias level as that of the fourth and fifth bipolar transistors, and wherein the multiplier is configured to generate the fourth current according to a current that flows through the first and fourth bipolar transistors.

14. A control circuit for a power factor correction circuit that comprises a DC/DC converter, the control circuit comprising:

an input voltage detection terminal configured to receive a first voltage having a full-wave rectified waveform;

a first error amplification circuit configured to amplify a difference between a predetermined reference voltage and a first detection voltage that corresponds to an output voltage of the DC/DC converter so as to generate a second voltage;

a voltage level judgment circuit configured to generate a third voltage having a discrete level that corresponds to an amplitude level of the first voltage;

a multiplying/dividing circuit configured to multiply the first voltage by the second voltage, and to divide the resulting product by the third voltage, so as to generate a fourth voltage;

a second error amplification circuit configured to amplify a difference between the fourth voltage and a second detection voltage so as to generate an error signal, wherein the second detection voltage corresponds to a current that flows through a switching transistor included in the DC/DC converter; and a driving circuit configured to drive the switching transistor according to the error signal, wherein the voltage level judgment circuit comprises:

a plurality of comparators each configured to generate a comparison signal which is asserted when the first voltage is higher than its predetermined threshold voltage;

a plurality of latch circuits each configured to latch its state when the corresponding comparison signal is asserted, and to be reset for each predetermined period; and a voltage generating unit configured to generate the third voltage having a level that corresponds to the states of the plurality of latch circuits.

15. A power factor correction circuit comprising:

a DC/DC converter comprising a switching transistor; and a control circuit configured to drive the switching transistor, wherein the control circuit comprises:

an input voltage detection terminal configured to receive a first voltage having a full-wave rectified waveform;

a first error amplification circuit configured to amplify a difference between a predetermined reference voltage and a first detection voltage that corresponds to an output voltage of the DC/DC converter so as to generate a second voltage;

a voltage level judgment circuit configured to generate a third voltage having a discrete level that corresponds to an amplitude level of the first voltage;

a multiplying/dividing circuit configured to multiply the first voltage by the second voltage, and to divide the resulting product by the third voltage, so as to generate a fourth voltage;

a second error amplification circuit configured to amplify a difference between the fourth voltage and a second detection voltage so as to generate an error signal, wherein the second detection voltage corresponds to a current that flows through a switching transistor included in the DC/DC converter; and a driving circuit configured to drive the switching transistor according to the error signal, wherein the multiplying/dividing circuit comprises:

a first voltage/current conversion circuit configured to apply the first voltage to a first resistor so as to generate a first current;

a second voltage/current conversion circuit configured to apply the second voltage to a second resistor so as to generate a second current;

a third voltage/current conversion circuit configured to apply a predetermined voltage to a third resistor so as to generate a third current; and a multiplier configured to generate a fourth current by multiplying the first current by the second current, and by dividing the resulting product by the third current, and to apply the resulting fourth current to a fourth resistor, so as to generate a fourth voltage.

16. An electronic device comprising:

a rectifier circuit configured to perform full-wave rectification of a commercial AC voltage;

a power factor correction circuit configured to receive an output voltage of the rectifier circuit; and a first DC/DC converter configured to receive an output voltage of the power factor correction circuit, to step up or otherwise step down the output voltage, and to output the output voltage thus stepped up or otherwise stepped down to a load, wherein the power factor correction circuit comprises:

a second DC/DC converter comprising a switching transistor; and a control circuit configured to drive the switching transistor, wherein the control circuit comprises:

an input voltage detection terminal configured to receive a first voltage having a full-wave rectified waveform;

a first error amplification circuit configured to amplify a difference between a predetermined reference voltage and a first detection voltage that corresponds to an output voltage of the second DC/DC converter so as to generate a second voltage;

a voltage level judgment circuit configured to generate a third voltage having a discrete level that corresponds to an amplitude level of the first voltage;

a multiplying/dividing circuit configured to multiply the first voltage by the second voltage, and to divide the resulting product by the third voltage, so as to generate a fourth voltage;

a second error amplification circuit configured to amplify a difference between the fourth voltage and a second detection voltage so as to generate an error signal, wherein the second detection voltage corresponds to a current that flows through the switching transistor; and a driving circuit configured to drive the switching transistor according to the error signal, wherein the multiplying/dividing circuit comprises:

a first voltage/current conversion circuit configured to apply the first voltage to a first resistor so as to generate a first current;

a second voltage/current conversion circuit configured to apply the second voltage to a second resistor so as to generate a second current;

a third voltage/current conversion circuit configured to apply a predetermined voltage to a third resistor so as to generate a third current; and a multiplier configured to generate a fourth current by multiplying the first current by the second current, and by dividing the resulting product by the third current, and to apply the resulting fourth current to a fourth resistor, so as to generate a fourth voltage.

* * * * *